(12) United States Patent
Lundahl et al.

(10) Patent No.: US 12,164,681 B2
(45) Date of Patent: *Dec. 10, 2024

(54) SYSTEMS AND METHODS FOR COMPUTER-IMPLEMENTED SURVEYS

(71) Applicant: InsightsNow Inc., Corvallis, OR (US)

(72) Inventors: David S. Lundahl, Corvallis, OR (US); Gregory Stucky, Corvallis, OR (US)

(73) Assignee: InsightsNow, Inc., Corvallis, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,326

(22) Filed: Mar. 15, 2024

(65) Prior Publication Data

US 2024/0220005 A1  Jul. 4, 2024

Related U.S. Application Data

(63) Continuation-in-part of application No. 16/708,748, filed on Dec. 10, 2019, now Pat. No. 11,978,070.
(Continued)

(51) Int. Cl.
*G06F 3/01* (2006.01)
*G06Q 30/0203* (2023.01)

(52) U.S. Cl.
CPC ......... *G06F 3/011* (2013.01); *G06Q 30/0203* (2013.01)

(58) Field of Classification Search
CPC ..... G06F 3/011; G06F 17/18; G06Q 30/0203; G06N 20/00
(Continued)

(56) References Cited

U.S. PATENT DOCUMENTS

| 10,043,411 B2 | 8/2018 | Ohme et al. |
| 2006/0155513 A1 | 7/2006 | Mizrahi et al. |

(Continued)

OTHER PUBLICATIONS

"Using EEG-Based BCI Devices to Subliminally Probe for Private Information" to Frank et al., May 30, 2017 (Year: 2017).*
(Continued)

*Primary Examiner* — Charles Guiliano
*Assistant Examiner* — Po Han Lee
(74) *Attorney, Agent, or Firm* — MUGHAL GAUDRY & FRANKLIN PC

(57) ABSTRACT

A survey method includes presenting a participant with a calibrating stimulus through a survey channel, wherein the survey channel can measure a reactive aspect of the participant's response to stimuli, measuring the reactive aspect of the participant's response to the calibrating stimulus through the survey channel, presenting the participant with a survey stimulus through the survey channel, measuring the reactive aspect of the participant's response to the survey stimulus through the survey channel, and evaluating the reactive aspect of the participant's response to the survey stimulus based on the reactive aspect of the participant's response to the calibrating stimulus. A computer-implemented survey method includes calibrating a survey system to determine individual cutoff times for individual participants in a survey, presenting survey content to the participants, monitoring the participants' responses to the survey content, and evaluating the individual participants' responses to the survey content based on the individual participants' cutoff times.

20 Claims, 14 Drawing Sheets

Related U.S. Application Data

(60) Provisional application No. 62/777,694, filed on Dec. 10, 2018.

(58) Field of Classification Search
USPC .......................................... 345/156; 705/7.32
See application file for complete search history.

(56) References Cited

U.S. PATENT DOCUMENTS

| | | | | |
|---|---|---|---|---|
| 2010/0311023 | A1* | 12/2010 | Kan | G09B 19/0038 |
| | | | | 434/258 |
| 2012/0259240 | A1 | 10/2012 | Llewellynn et al. | |
| 2013/0060602 | A1* | 3/2013 | Rupp | G06Q 30/0242 |
| | | | | 705/7.29 |
| 2013/0224697 | A1 | 8/2013 | McCallum et al. | |
| 2015/0302436 | A1* | 10/2015 | Reynolds | G06Q 10/06 |
| | | | | 705/7.32 |
| 2016/0225278 | A1 | 8/2016 | Leddy | |
| 2017/0000400 | A1* | 1/2017 | Gordon | A61B 5/165 |
| 2018/0157691 | A1 | 6/2018 | Venanzi et al. | |
| 2018/0225602 | A1 | 8/2018 | Joi et al. | |

OTHER PUBLICATIONS

Advisory Action notified Jul. 28, 2022 for U.S. Appl. No. 16/708,748.
Advisory Action notified May 25, 2023 for U.S. Appl. No. 16/708,748.
Final Office Action notified Jun. 3, 2022 for U.S. Appl. No. 16/708,748.
Final Office Action notified Mar. 14, 2023 for U.S. Appl. No. 16/708,748.
Frank et al., "Using EEG-Based BCI Devices to Subliminally Probe for Private Information," WPES '17: Proceedings of the 2017 on Workshop on Privacy in the Electronic Society, Oct. 2017, arXiv. 1312.6052v2 May 30, 20217. pp. 133-136, https://doi.org/10.1145/3139550.3139559 (12 pages).
Non-Final Office Action notified Dec. 8, 2021 for U.S. Appl. No. 16/708,748.
Non-Final Office Action notified Jul. 20, 2023 for U.S. Appl. No. 16/708,478.
Non-Final Office Action notified Oct. 3, 2022 for U.S. Appl. No. 16/708,748.
Notice of Allowance notified Jan. 31, 2024 for U.S. Appl. No. 16/708,748.
Restriction Requirement notified Aug. 11, 2021 for U.S. Appl. No. 16/708,748.

\* cited by examiner

Today we will be using a question style which monitors how fast you answer. The next set of questions will help us personalize the questions for you.

Please pick three numbers and remember which three you picked.

☐ One
☐ Two
☐ Three
☐ Four
☐ Five
☐ Six
☐ Seven
☐ Eight
☐ Nine
☐ Ten

FIG. 3

Was this one of the three numers you picked?

One

YES       No

FIG. 4

| Response Matrix | | Negative | Positive |
|---|---|---|---|
| Implicit | Fast | Weight −1<br>cell 4 | Weight +1<br>cell 1 |
| Explicit | Slow | Weight −0.5<br>cell 3 | Weight +0.5<br>cell 2 |

Thinking about a typical/normal breakfast at home before heading out for the day, when you are eating cereal (hot or cold), how do you feel about the following ingredient:

HONEY

OK            AVOID

| Response Matrix | AVOID | OK |
|---|---|---|
| Implicit — Fast | Weight −1 | Weight +1 |
| Explicit — Slow | Weight −0.5 | Weight +0.5 |

216

| Response | Questions to Ask | Answer List Option |
|---|---|---|
| Fast-Positive | Q1a | Answers 1-10 |
| Slow-Positive | Q1b and Q3 | Answers 1-5 and 11-15 |
| Slow-Negative | Q2a | Answers 1-10 |
| Fast-Negative | Q2b | Answers 1-5 |

SYSTEMS AND METHODS FOR COMPUTER-IMPLEMENTED SURVEYS

CLAIM OF PRIORITY

This application is a continuation-in-part of U.S. patent application Ser. No. 16/708,748 filed Dec. 10, 2019, now issued as U.S. Pat. No. 11,978,070 on May 7, 2024, and which claims priority from U.S. Provisional Patent Application No. 62/777,694 filed Dec. 10, 2018, which is incorporated by reference.

COPYRIGHTS

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Each point on the graph represents the response of a group of participants to an item in the survey such as a movie character, a business practice, or a food ingredient. The vertical axis represents a collective measure of the participants' response time, while the horizontal axis represents a collective measure of the participants' approval, avoidance, or other substantive reaction to the item. The conventional technique for evaluating the response time is to simply calculate the average amount of time it takes for participants to respond to an item, and then apply conventional statistical analysis to data points from multiple items to decide as to what is considered a "fast" or "slow" response for a typical person.

The techniques illustrated in FIG. 1 have some inherent disadvantages in the way survey data is collected, processed, and presented, thereby limiting the ability to provide insights into the participants' thinking. First, these techniques disregard inherent differences in response times between individual participants who may have different cognitive styles or may simply have faster or slower reflexes. Second, they disregard differences in response times between different survey channels and environments, e.g., a participant may be more focused and able to respond more quickly when using a mouse on a desktop computer in a cubicle than when pressing a touchscreen on a mobile device while surrounded by distractions. Third, the collective nature of the data and the way it is analyzed may lose much of the nuanced information that could otherwise be obtained from individual participants. Fourth, the specific way the results are displayed may be difficult for some viewers to comprehend.

SUMMARY

A survey method may include presenting a participant with a calibrating stimulus through a survey channel, wherein the survey channel is capable of measuring a reactive aspect of the participant's response to stimuli, measuring the reactive aspect of the participant's response to the calibrating stimulus through the survey channel, presenting the participant with a survey stimulus through the survey channel, measuring the reactive aspect of the participant's response to the survey stimulus through the survey channel, and evaluating the reactive aspect of the participant's response to the survey stimulus based on the reactive aspect of the participant's response to the calibrating stimulus.

The reactive aspect of the participant's response may include a response time. The calibrating stimulus and the survey stimulus may include verbal questions. The verbal questions may include written questions. The calibrating stimulus and survey stimulus may include images. The survey channel may be further capable of measuring a substantive aspect of the participant's response to stimuli.

The method may further include measuring the substantive aspect of the participant's response to the survey stimulus through the survey channel and evaluating the substantive aspect of the participant's response to the survey stimulus based on the reactive aspect of the participant's response to the calibrating stimulus. The reactive aspect of the participant's response may include a response time. The survey stimulus may include a verbal question, and measuring the substantive aspect of the participant's response to the survey stimulus may include recording the participant's substantive response to the verbal question. The participant's substantive response to the verbal question may include a multiple choice response.

The participant may be one of multiple participants, the survey channel may be one of one or more survey channels, wherein each survey channel is capable of measuring a reactive aspect and a substantive aspect of a participant's response to stimuli, and the method may further include: presenting the multiple participants with calibrating stimuli through the one or more survey channels, measuring the reactive aspect of the multiple participants' responses to the calibrating stimuli through the one or more survey channels, presenting the multiple participants with survey stimuli through the one or more survey channels, and measuring the reactive aspect and the substantive aspect of the multiple participants' responses to the survey stimuli through the one or more survey channels; and the method may further include evaluating the reactive aspect of the multiple participants' responses to the survey stimuli based on the reactive aspect of the multiple participants' responses to the calibrating stimuli.

The method may further include aggregating the multiple participants' responses to the survey stimuli based on the reactive and substantive aspects of the responses. The method may further include applying weights to the aggregated responses. The method may further include summing the weighted responses, thereby generating a response value. The multiple participants' responses may be aggregated by dividing the responses into groups based on the reactive and substantive aspects of the responses. The groups may be based on discrete characterizations of the reactive and substantive aspects of the responses.

The reactive aspect of the responses may be characterized as fast or slow, and the substantive aspect of the responses may be characterized as positive or negative. The aggregated responses may be arranged in a two-dimensional representation, and the method may further include transforming the two-dimensional representation to a one-dimensional representation. The method may further include presenting the participant with at least one additional survey stimulus based on the reactive and substantive aspects of the participant's response to the survey stimulus. The additional survey stimulus may include one or more survey questions customized to the participant. The additional survey stimulus may include one or more survey answers customized to the participant.

A computer-implemented survey method may include calibrating a survey system to determine individual response times for individual participants in a survey, presenting survey content to the participants, monitoring the participants' responses to the survey content, and evaluating the individual participants' responses to the survey content based on the individual participants' response times. Calibrating the survey system may include, presenting one participant with a timed calibrating test, monitoring the one participant's response to the timed calibrating test, and determining a cut-off point based on the one participant's response to the timed calibrating test.

The method may further include using the one participant's cut-off point to evaluate the one participant's responses to survey content. The method may further include using the one participant's cut-off point to evaluate other similarly situated participants' responses to survey content. Calibrating the survey system may further include presenting multiple participants with a timed calibrating test, monitoring the multiple participants' responses to the timed calibrating test, and determining cut-off points for the multiple participants based on the multiple participants' responses to the timed calibrating test. The method may further include recalibrating the survey system in response to a change in a survey environment. The timed calibrating test may include a task and one or more follow-up questions based on the task.

Evaluating the individual participants' responses to the survey content based on the individual participants' response times may include categorizing the responses into one or more groups. The method may further include applying one or more weights to responses in one or more of the groups. The method may further include summing the weighted responses from the one or more cells to calculate a response value. The method may further include changing one or more of the weights based on an objective of the survey. One or more of the weights may be determined dynamically at least in part by participants' previous responses to the survey content. One or more of the weights may be determined dynamically at least in part by purchase probabilities based on participants' previous responses to the survey content. Each of the one or more groups may include a cell in a matrix. The method may further include transforming the responses in the cells to a one-axis visualization. The method may further include providing customized survey content to individual participants in response to evaluating the individual participants' responses. The customized survey content includes one or more custom questions and corresponding answer options.

A computer-implemented survey method may include categorizing survey responses into cells in a matrix and applying a weight to responses in one or more of the cells. The method may further include summing weighted responses from the one or more cells, thereby calculating a response value. A computer-implemented survey method may include categorizing survey responses into cells in a matrix having two or more axes and transforming the responses from the cells to a one-axis visualization.

A survey system may include a survey platform having a processor configured to: calibrate the survey system to determine individual response times for individual participants in a survey, present survey content to the participants, monitor the participants' responses to the survey content, and evaluate the individual participants' responses to the survey content based on the individual participants' response times. The processor may be further configured to calibrate the survey system by: presenting one participant with a timed calibrating test, monitoring the one participant's response to the timed calibrating test, and determining a cut-off point based on the one participant's response to the timed calibrating test.

A survey system may include a survey platform having a processor configured to: present a participant with a calibrating stimulus through a survey channel, wherein the survey channel is capable of measuring a reactive aspect of the participant's response to stimuli, measure the reactive aspect of the participant's response to the calibrating stimulus through the survey channel, present the participant with a survey stimulus through the survey channel, measure the reactive aspect of the participant's response to the survey stimulus through the survey channel, and evaluate the reactive aspect of the participant's response to the survey stimulus based on the reactive aspect of the participant's response to the calibrating stimulus.

BRIEF DESCRIPTION OF THE DRAWINGS

FIG. 3 illustrates a first part of a timed calibration test, according to at least one example.

FIG. 4 illustrates a second part of a timed calibration test, according to at least one example.

FIG. 12 illustrates a response matrix and table illustrating how customized survey questions and/or answer sets may be provided to a participant, according to at least one example.

DETAILED DESCRIPTION

Figure 2:
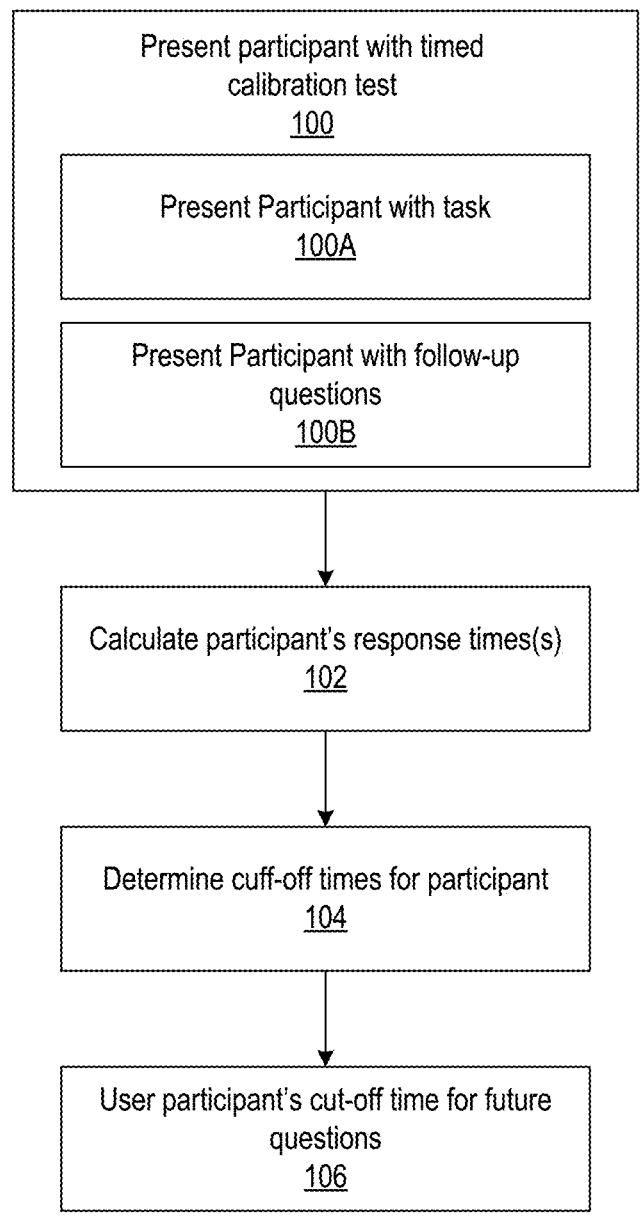
FIG. 2 illustrates a method for calibrating a computer-implemented survey system to accommodate differences in the response times of individual participants, according to at least one example.

FIG. 2 illustrates a method for calibrating a computer-implemented survey system to accommodate differences in the response times of individual participants, according to at least one example. In at least one example, method begins at step 100 where the system presents a participant with a timed calibration test where all responses are known to be "fast." In at least one example, step 100 may be a single-part test, or it may have one or more sub steps. For example, the timed calibration test may have a first part 100A where the participant is presented with a task such as picking a group of numbers as shown in FIG. 3, and a second part 100B where the participant is presented with one or more follow-up questions as shown in FIG. 4. In the example of FIG. 4, the system may cycle through the same question for each of the group of numbers, presented randomly, each time recording the participant's response time. In at least one example, the first part may include asking the participant to select the three colors they like best from a list of ten colors. In the second part, the system may then cycle through all ten colors, again presented randomly, each time asking the participant if the color is one of the ones they selected and recording the participant's response time. Other examples of timed calibration tests include tests based on other symbols or patterns.

At step 102, the system calculates an average or other statistical measure of the participant's response times and at step 104 determines a threshold value or other suitable parameter for evaluating the personalized cutoff time for the participant. For example, the 90th percentile of a participant's response times may be used as the cutoff for a "fast" response for that participant. At step 106, the system uses the threshold value or other parameter as the basis for determining the participant's cutoff time for further questions in the survey.

The calibrating process illustrated in FIG. 2 may be repeated for each participant, or for a group of similarly situated participants. It may also be repeated to provide a new measure of "fast" when there is a change in the survey environment, for example, a change in the survey channel (mobile, desktop, kiosk, telephone, etc.), the survey content, the time of day, or any other factor which may affect the participant's response time.

The inventive principles relating to personalized cutoff times may provide more accurate and/or insightful survey results. They may also provide an improved basis for comparing survey results from different groups of participants who complete surveys under greatly different conditions including participating in surveys through different channels such as desktop browsers, mobile apps, telephone, and other channels as described below.

Figures 5, 6:
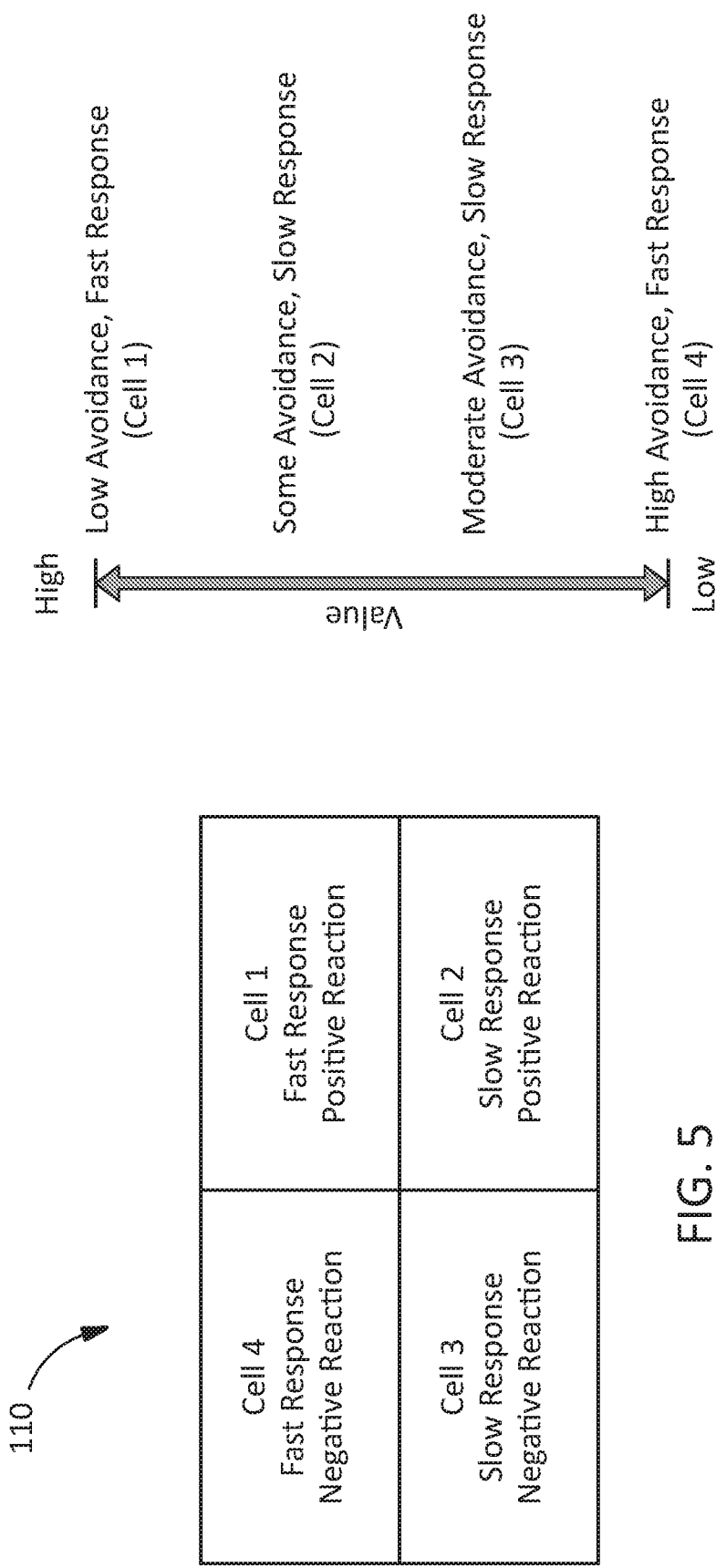
FIG. 5 illustrates a response matrix for categorizing, and facilitating further processing of, survey responses, according to at least one example.
FIG. 6 illustrates a one-axis representation obtained by transforming data from the response matrix of FIG. 5, according to at least one example.

FIG. 5 illustrates a response matrix for characterizing, categorizing, and/or facilitating further processing of survey responses, according to at least one example. In at least one example, matrix 110 of FIG. 5 is arranged along two-axes, but unlike the graph of FIG. 1, each axis of matrix 110 represents a discrete (e.g., binary) categorization rather than a continuous scale. In at least one example, matrix 110 may be transformed to a one-axis representation as shown in FIG. 6 and explained in more detail below.

Referring again to FIG. 5, a fast response that includes a positive reaction is categorized into cell 1, a slow response with a positive reaction is categorized in cell 2, a slow, negative response is categorized in cell 3, and a fast, negative response is categorized in cell 4.

Responses that fall into the top row of the matrix (cells 1 and 4) may be described as implicit or emotional responses because they tend to be impulsive or reflexive, e.g., based on fast thinking. Reponses that fall into the bottom row of the matrix (cells 2 and 3) may be described as explicit or reasoned responses because they tend to be based on studied thought or consideration, e.g., based on slower thinking.

Figures 7, 8:
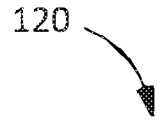
FIG. 7 illustrates a response matrix for categorizing, and facilitating further processing of, survey responses, according to at least one example.
FIG. 8 illustrates a survey question relating to an ingredient, according to at least one example.

FIG. 7 illustrates a response matrix for categorizing, and facilitating further processing of, survey responses, according to at least one example. In at least one example, matrix 120 includes four cells arranged in the same manner as matrix 110 of FIG. 5, but matrix 120 of FIG. 7 includes weights that are assigned to the responses that fall into each cell. In this example, cells 1, 2, 3, and 4 are assigned weights of +1, +0.5, −0.5, and −1, respectively, but other weights may be used. These weights may be used to transform the results from matrix 120, which is a two-axis matrix, to a one-axis value that can be visualized as shown in FIG. 6. For example, the following equation (Eq. 1) may be used to calculate a value based on the results categorized into each of the four cells:

$$\text{Value} = \left[\sum_{i=1}^{4} \frac{\text{Cell}_i \text{Weight}_i}{2}\right] + 50 \quad (1)$$

where $\text{Cell}_i$ is the percentage of responses categorized in $\text{Cell}_i$, and Weight is the weight assigned to $\text{Cell}_i$. Some results for various illustrative cases using Eq. 1 are shown in Table 1 below.

TABLE 1

|  | Cell 1 | Cell 2 | Cell 3 | Cell 4 | Value |
| --- | --- | --- | --- | --- | --- |
| "Best" Case | 100% | 0% | 0% | 0% | 100 |
| "Worst" Case | 0% | 0% | 0% | 100% | 0 |
| Uniform Case | 25% | 25% | 25% | 25% | 50 |
| Example Case | 60% | 18% | 6% | 16% | 75 |

Applying Eq. 1 to the Example Case shown in Table 1, $\text{Cell}_1=60$, $\text{Weight}_1=1$, $\text{Cell}_2=18$, $\text{Weight}_2=0.5$, $\text{Cell}_3=6$, $\text{Weight}_3=-0.5$, $\text{Cell}_4=16$, and $\text{Weight}_4=-1$. Thus, the Value for the Example Case=60/2+9/2−3/2−16/2+50 which equals 30+4.5−1.5−8+50=75. This example illustrates how applying different weights to the various cells may produce more insight into the participants' responses. In this example, the faster (more emotional or implicit) responses are weighted more heavily than the slower (more rational or explicit) responses, which is consistent with studies relating to the emotional component of human thinking and decision making.

In at least one example, the values obtained for various survey items can then be placed along a single axis shown in FIG. 6 to provide a simpler visualization of survey results on a computer screen. This may be preferable in some situations because people can often comprehend information that is reduced to a single axis value or score more readily than information that requires two dimensions for visualization.

Figure 9:
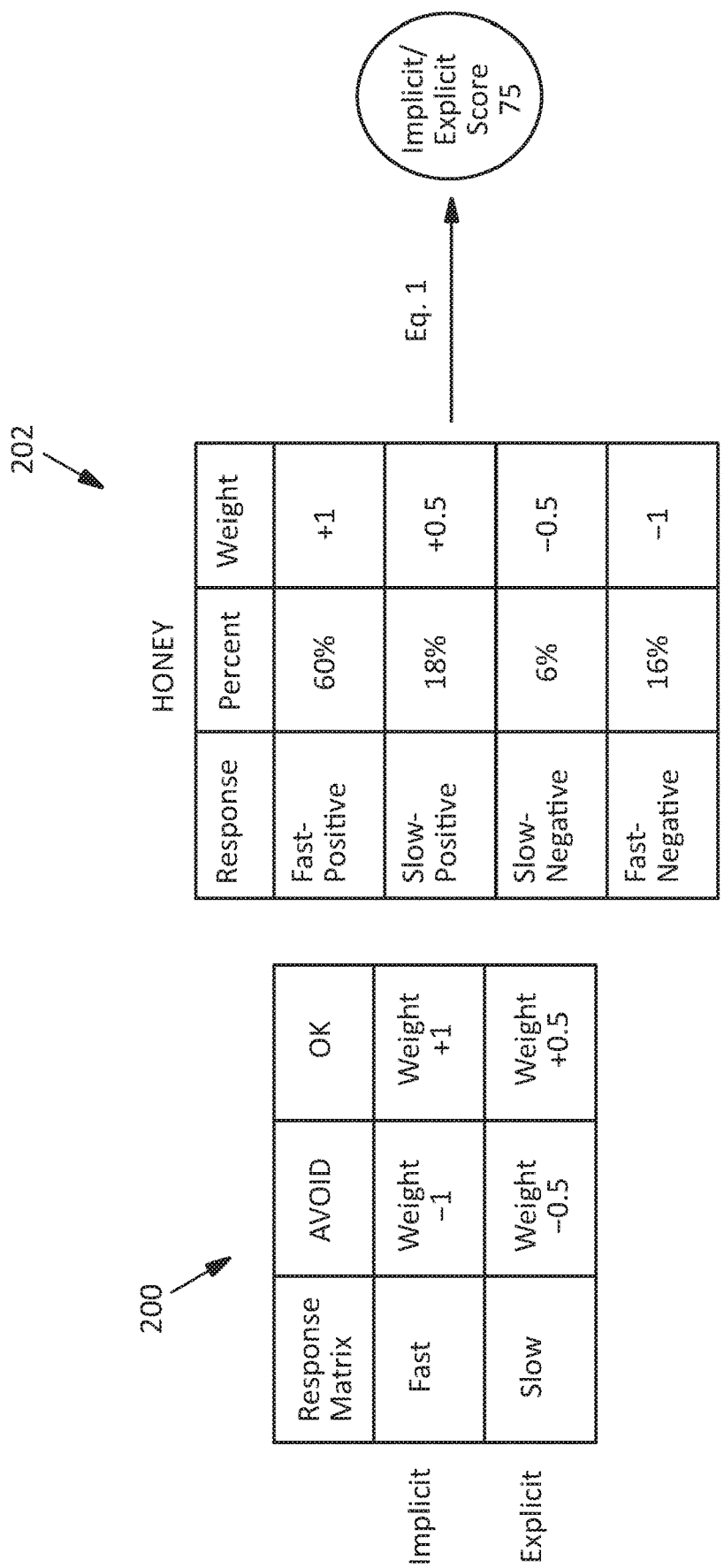
FIG. 9 illustrates a response matrix and table for scoring the ingredient shown in FIG. 8, according to at least one example.

FIG. 8 illustrates a survey question relating to an ingredient, according to at last one example. FIG. 9 illustrates a response matrix and table for scoring the ingredient shown in FIG. 8, according to at least one example. In this example, honey is used as an ingredient, but the inventive principles may apply to any other ingredient or attribute of any survey subject.

In at least one example, response matrix 200 is similar to that of FIG. 7 but with the "Avoid" as the Negative response and "OK" as the Positive response. The individual participants' responses to the survey question of FIG. 8 may be evaluated as implicit (fast) or explicit (slow), for example, using an individualized calibrating method such as that described above with respect to FIGS. 2-4. Thus, each response may be evaluated and placed in a group as either Fast-Positive, Slow-Positive, Slow-Negative, or Fast-Negative as shown in Table 202 which lists the percentage of total responses falling into each of the four groups in the cells of the center column. The weight from each of the cells of response matrix 200 are shown in a corresponding cell of Table 202. The data from Table 202 may then be processed using Eq. 1 to calculate a value of 75 which, in this example, may be referred to as an Implicit/Explicit Score.

Figure 10:
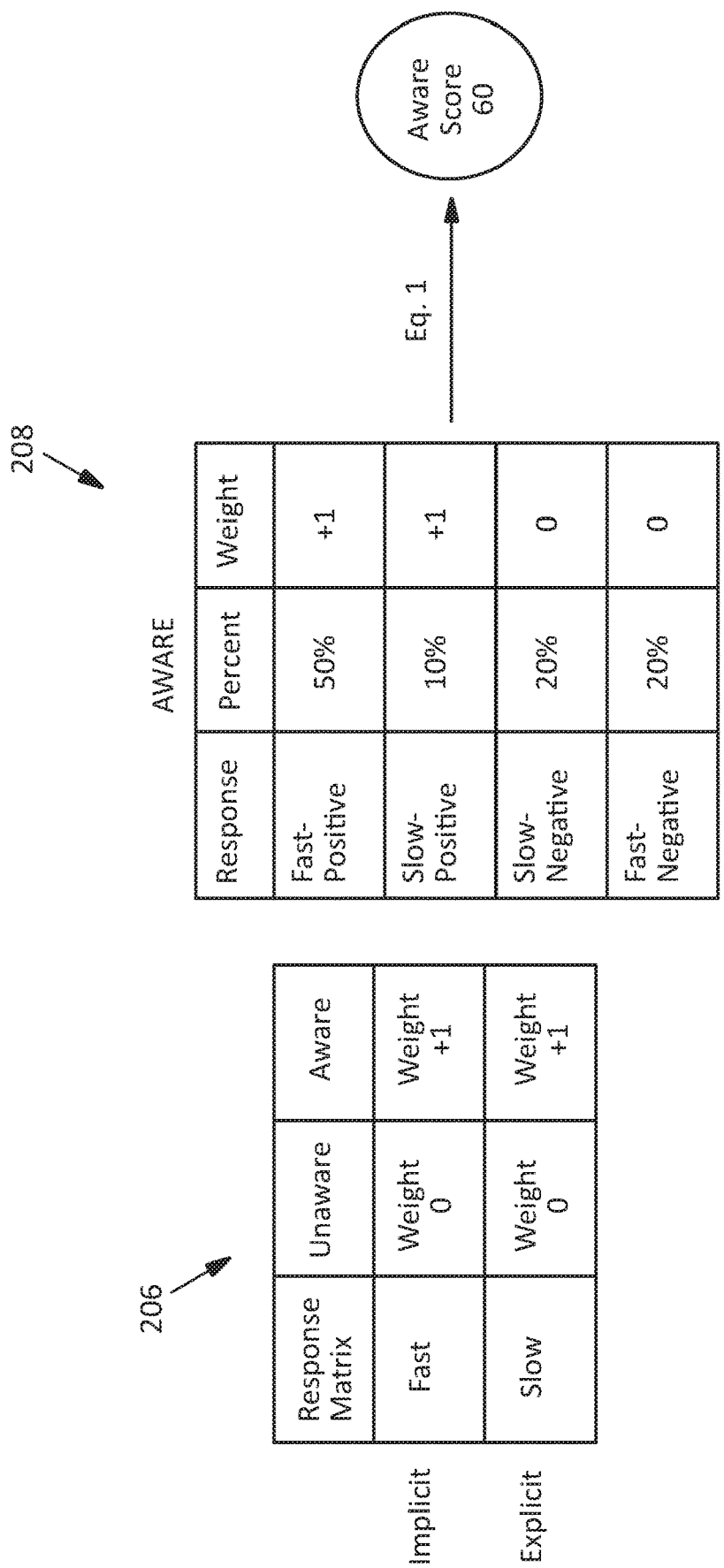
FIG. 10 illustrates a response matrix and table illustrating how weights may be changed based on one or more objectives of the survey, according to at least one example.

FIG. 10 illustrates a response matrix and table, according to at least one example. FIG. 10 may illustrate how the weights assigned to each group of responses, which in this example are associated with cells of response matrix 206, may be changed based on one or more objectives of the survey or portion thereof. In at least one example, a transformation is applied to the cells of response matrix 206 to implement a brand awareness score. In at least one example, the survey question shown in FIG. 8 may be replaced with a question regarding a brand and an answer set with options that indicate the participant is either "Aware" of the brand (Positive response) or "Unaware" of the brand (Negative response). The weights for responses in the "Unaware" cells may be set to zero, while the weights for responses in the "Aware" cells may be set to +1.

Again, the individual participants' responses to the survey question regarding brand awareness may be evaluated as implicit (fast) or explicit (slow), for example, using an individualized calibrating method such as that described above with respect to FIGS. 2-4. Thus, each response may be evaluated and placed in a group as either Fast-Positive, Slow-Positive, Slow-Negative, or Fast-Negative as shown in Table 208 which lists the percentage of total responses falling into each of the four groups in the cells of the center column. The weight from each of the cells of response matrix 206 are shown in a corresponding cell of Table 208. The data from Table 208 may then be processed using Eq. 1 to calculate a value of 60 which, in this example, may be referred to as an Aware Score.

Figure 11:
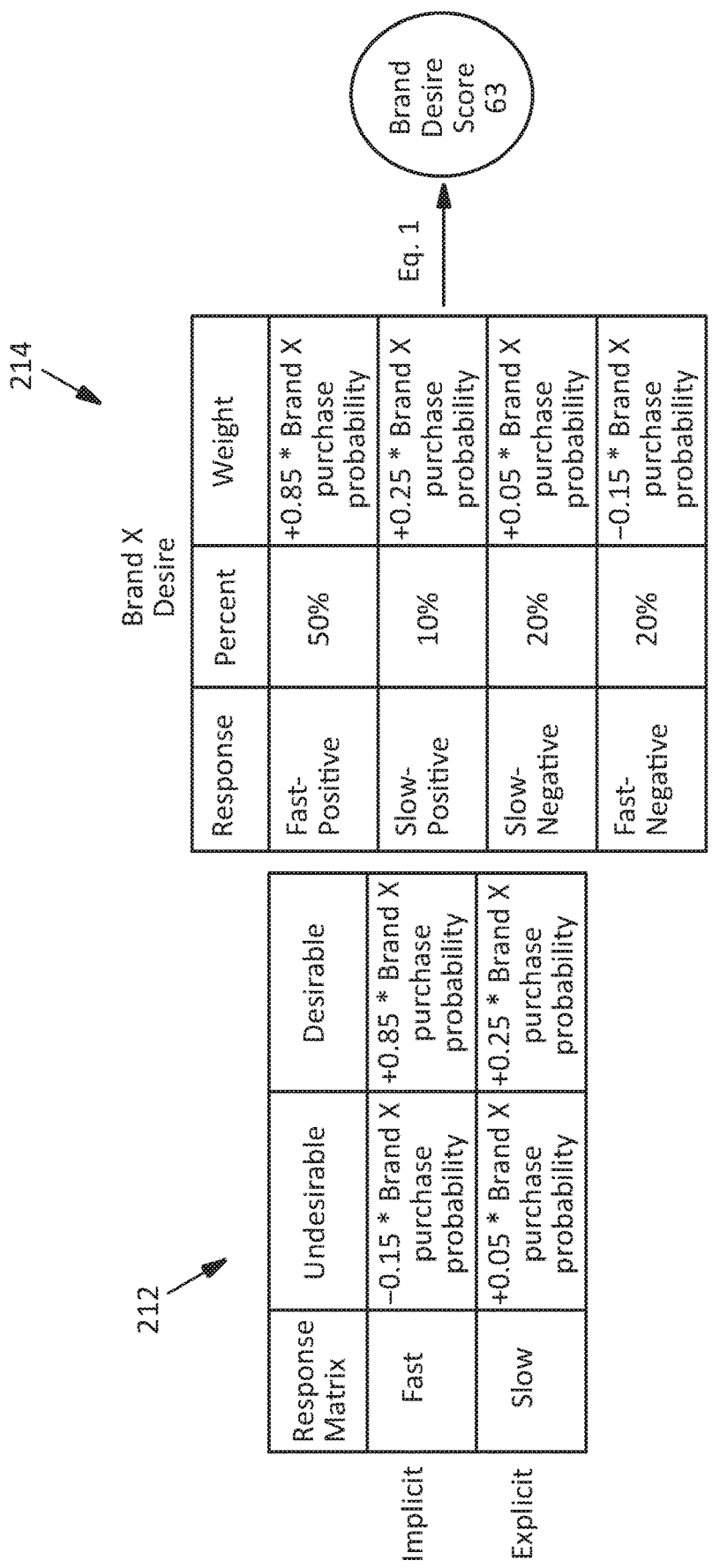
FIG. 11 illustrates a response matrix and table illustrating how weights may be changed dynamically based on participants' responses to previous survey questions, according to at least one example.

FIG. 11 illustrates a response matrix and table, according to at least one example. FIG. 11 may illustrate how the weights assigned to each group of responses, which in this example are associated with cells of response matrix 212, may be changed dynamically based, at least in part, on participants' responses to previous survey questions. In the example of FIG. 11, a brand awareness question, answer set and individualized calibrating method such as that used for FIG. 10 may be used as a starting point, but the weights shown in response matrix 212 may be transformed to the dynamic weights shown in the corresponding cells of the weight column in Table 214. Each of the weights in Table 214 includes a fixed portion multiplied by a Brand X purchase probability (BXPP) which in this example may be a dynamic number between 0 and 1 and may be based on participants' responses to previous questions in the survey. In at least one example, an average or overall BXPP for all participants may be used. In at least one example, the BXPP in each cell may be an average or overall value that is specific to the group of participants who provided the specific response for that row. In at least one example, an individual BXPP may be used for each individual participant. For purposes of illustration, assuming an overall BXPP for all participants of 0.605, the data from Table 214 may then be processed using Eq. 1 to calculate a value of 63 which, in this example, may be referred to as a Brand Desire Score.

FIG. 12 illustrates a response matrix and table, according to at least one example. FIG. 12 may illustrate how the transformation a participant gives to the implicit/explicit determination may be used to provide customized (personalized) survey questions and/or answer sets (lists) dynamically, e.g., in real time during a survey. In at least one example, customized survey content such as custom questions and corresponding answer options may be provided to individual participants based on evaluating the individual participants' responses to previous questions, whether calibrating questions or survey questions.

In the example of FIG. 12, an ingredient avoidance or acceptance question, answer set and individualized calibrating method such as that used for FIG. 9 may be used as a starting point, but any other type of survey content may be used. In at least one example, response matrix 216 may include "Avoid" as a Negative response and "OK" as a Positive response. In at least one example, as alternative to, or in addition to, Table 202 of FIG. 9, FIG. 12 includes Table 218. Table 218 identifies one or more additional questions that may be presented to a group of participants based on which of the four response groups each participant belongs to. For example, a participant who provided a Fast-Positive response would be presented with Question Q1a and provided with possible answers 1-10. Likewise, participant who provided a Slow-Positive response would be presented with questions Q1b and Q3, along with possible answers 1-5 and 11-15, respectively.

In at least one example, a participant may be presented with additional survey questions based on any aspect of the two-dimensional matrix representation. This may include questions based on reactive, and substantive aspects, positive and negative aspects, or any combination of implicit, explicit, positive, and negative responses. Additionally, a participant may be presented with at least one additional survey question based on the weighted response value from multiple questions and/or participants. In at least one example, a participant may be presented with a question based on a value which comes from the mathematical calculation of their weighted responses. In at least one example, after a group of participants take a survey, one or more later participants may be presented with one or more question based on how the one or more later participants compare to the group of participants who previously took the survey.

Figure 13:
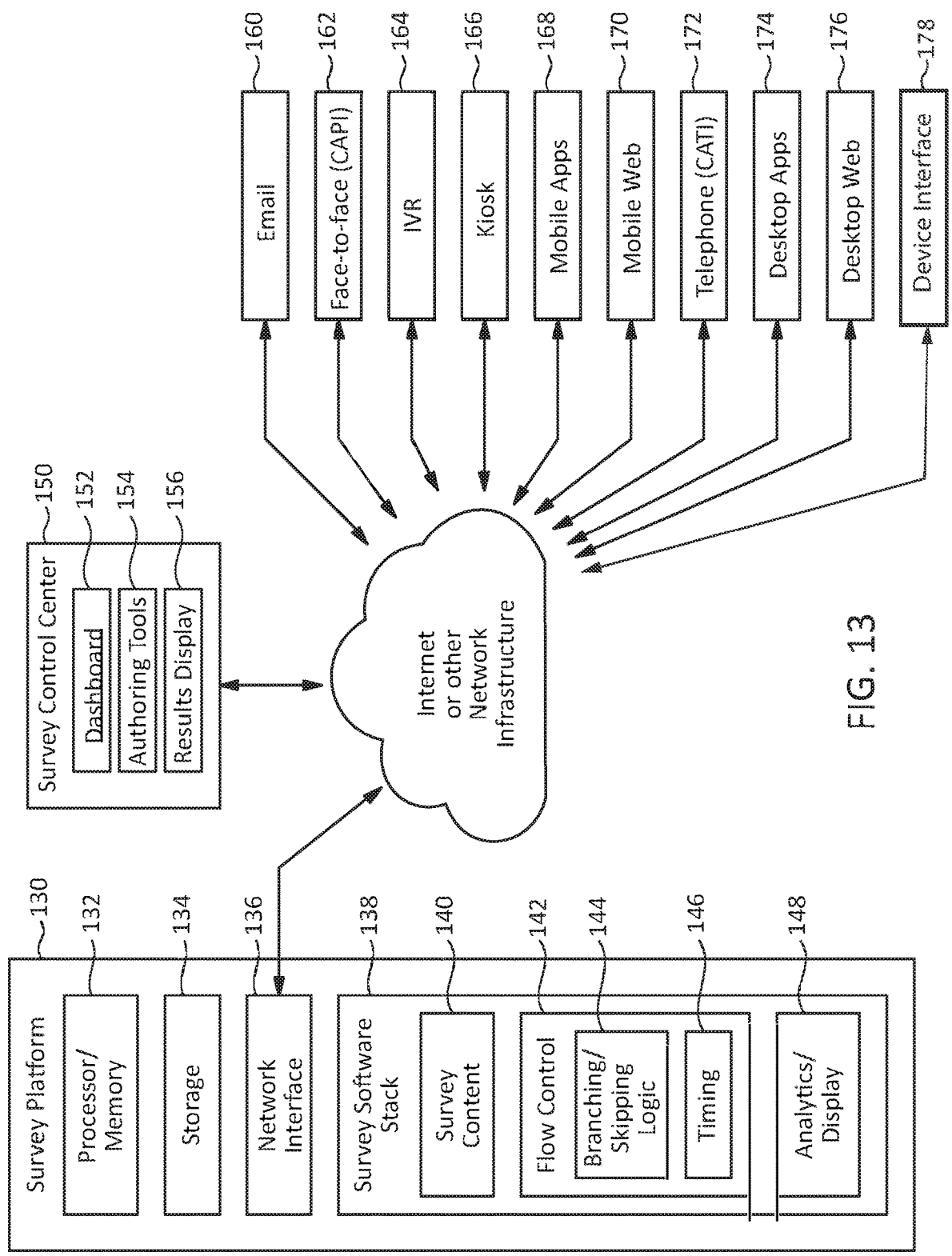
FIG. 13 illustrates a system for implementing a computer-implemented survey, according to at least one example.

FIG. 13 illustrates a system suitable for implementing any of the methods described herein, according to at least one example. In the example system of FIG. 8, a survey platform 130 is implemented as software as a service (SaaS) which typically runs on cloud infrastructure, but it may also be implemented with any suitable arrangement of hardware and software infrastructure. In at least one example, survey platform 130 includes a processor/memory 132, data storage 134, and network interface 136. In at least one example, a survey software stack 138 includes various modules for implementing the functionality described herein. In at least one example, a survey content module 140 handles the storage and display of questions, images, and any other content that forms the core of a survey. In at least one example, a flow control module 142 includes functionality for presenting content to survey participants. In at least one example, flow control module 142 includes a logic module 144 for branching and skipping questions, and a timing module 146 for measuring, processing, and recording response times. In at least one example, an analytics/display module 148 handles any real-time or post-survey processing of results and presents them using various reporting and visualization tools. In at least one example, timing module 146 may be used to implement methods for accommodating differences in the response times of individual participants such as the methods illustrated in FIGS. 2-4. In at least one example, analytics/display module 148 may be used to implement matrix and data transformation methods including the methods described with respect to FIGS. 5-7.

In at least one example, a survey control center 150 may be implemented through a browser window connected to survey platform 130 through the internet or other network infrastructure or using any other suitable combination of hardware and software. In at least one example, a dashboard module 152 provides overall control of survey operations including deployment, scheduling, collecting results, etc. In at least one example, authoring tools 154 enable a user to create, store and modify surveys, and a display module 156 displays survey results in the form of reports, charts, graphs, and other visualization tools.

In at least one example, the right side of FIG. 13 illustrates some of the channels through which survey participants may interact with the system. Two of the most common channels are mobile web 170 and desktop web 176 where the participant interacts with the survey through a web browser. Another common channel is mobile apps 168 in which a participant downloads and uses a dedicated application to monitor activities and respond to survey questions. Other useful channels include email 160, face-to-face interviews facilitated by computer assisted personal interviewing (CAPI) 162, interactive voice response (IVR) 164, kiosk operations 166, telephone surveys facilitated by computer assisted telephone interviewing (CATI) 172, desktop applications 174, and device interface 178. In at least one example, device interface 178 includes one or more of a graphical user interface (GUI), an optical interface, an acoustic interface, a verbal interface, a tactile interface, or an auditory interface.

Example of survey platforms that may be programed or adapted to operate according to the inventive principles of this patent disclosure include those operated by Confirmit and/or Askia.

In at least one example, for a channel to be capable of accurately measuring the speed of a survey participant's response, it operates faster than a human can practically operate. In at least one example, the average time for a participant to provide a fast response may be less than two seconds. In at least one example, to accurately, reliably, and consistently measure a participant's response times to calibrating and survey questions, the measurement system may need to have a resolution of tenths or even hundredths of a second, which is beyond the ability of ordinary people.

In at least one example, one or more processors such as a processor of processor/memory 132 in FIG. 13 may be programmed or otherwise configured to measure a participant's response times to calibrating and survey questions. Such a configuration may be used to measure response times to questions in surveys conducted through any suitable channel including those described in FIG. 13. In at least one example, in a survey conducted through face-to-face interviews facilitated by computer assisted personal interviewing (CAPI), a processor may be configured to measure the time between when the surveyor finishes asking a question and when the participant begins responding. Such a configuration may use, for example, voice activation/deactivation techniques to identify the beginning and end of a timing interval. Similar configurations may be used for surveys conducted through interactive voice response (IVR) and telephone surveys facilitated by computer assisted telephone interviewing (CATI).

The examples disclosed above have generally been described in the context of online surveys using written questions, where the participant's response time indicates whether the response may be characterized as an implicit or explicit response. In at least one example, the principles discussed herein may also be applicable to any survey methods and systems that can measure various aspects of a participant's response to any stimulus that may be used in a survey, including examples in which a human cannot practically measure one or more aspects of the response.

Stimuli, which includes both calibrating stimuli and survey stimuli, may generally be characterized as semantic (e.g., using words or language) or non-semantic which may include images, music, or any sounds other than language, scents, flavors, etc.

A survey response may generally be characterized as having at least two aspects or parts: a substantive part, and a reactive part. The substantive part may generally be thought of as the actual content of the answer, for example, the yes or no response to a binary question, or the options selected by a participant in response to a list of options. Measurement of the substantive part of a response may generally be straightforward and involve things such as recording which of various answer options have been selected, saving free-form answer questions, recording the substance of spoken survey responses during a telephone or in-person survey, etc.

The reactive part of a response may provide additional information, for example, to indicate whether the response may be characterized as implicit or explicit. The reactive part may be measured, for example, based on physical, physiological, neurophysiological, and/or other aspects of the response that may indicate whether the response is (1) primarily based on implicit factors such as habits, impulses, emotions, and/or intuitive, visceral, affective, indirect, and/or subconscious thought processes, or (2) primarily based on explicit factors such as study, analysis, contemplation and/or deliberate, rational, logical, and/or conscious thought processes.

In at least one example, the reactive part may generally be measured by physically measuring the participant's response time to a written question. In at least one example, the reactive part may be measured based on physiological or neurophysiological effects. Examples of such effects that may be used to measure reactive aspects of a response include biometrics (e.g., autonomic nervous system, skin conductance, heart rate, breathing, etc.), brain scans (e.g., central nervous system, EEG, fMRI, PET scans, etc.), facial expressions (e.g., facial EMG, facial coding, etc.), and pupil movements. For example, a computer-implemented survey system may include one or more processors and a camera configured to use software for facial coding recognition to record facial expression such as a smile or a grimace as a measure of the reactive aspect of the participant's response to stimulus such as a question or image.

In at least one example, the reactive aspects of responses may be characterized as semantic such as inflection and/or loudness of spoken words, cadence of response, and the like. These reactive aspects of responses may be measured using, for example, speech recognition and/or analysis software running on the survey platform. In at least one example, a facial expression may be used as the substantive or reactive part of a response. For example, a facial expression such as a smile may be recorded as the substantive aspect of the response, while the amount of time it took the smile to develop may be considered the reactive aspect of the response.

The inventive principles of one or more examples can be modified in arrangement and detail without departing from the inventive concepts. For example, a method for determining a participant's response speed has been described in the context of examples having binary categorization, e.g., having two-values such as fast/slow, but the inventive principles also apply to systems that use more than one discrete cutoff point, e.g., fast/medium/slow, and to systems that use a speed score or rating, or even a speed that is expressed as a function of some other variable such as question complexity, time of day, etc. In at least one example, survey responses, weights, and other aspects have generally been described as being divided into discrete ranges or quantities, but in other examples, continuous values may be used. In at least one example, rather than having percentages of responses and/or weights divided into groups, they may be expressed as continuous functions or values. In at least one example, weights may be applied to individual responses before being aggregated into groups. Such changes and modifications are considered to fall within the scope of the following claims. The various inventive principles of one or more examples described herein have independent utility, but they may also be combined to provide synergistic results.

Figure 14A:
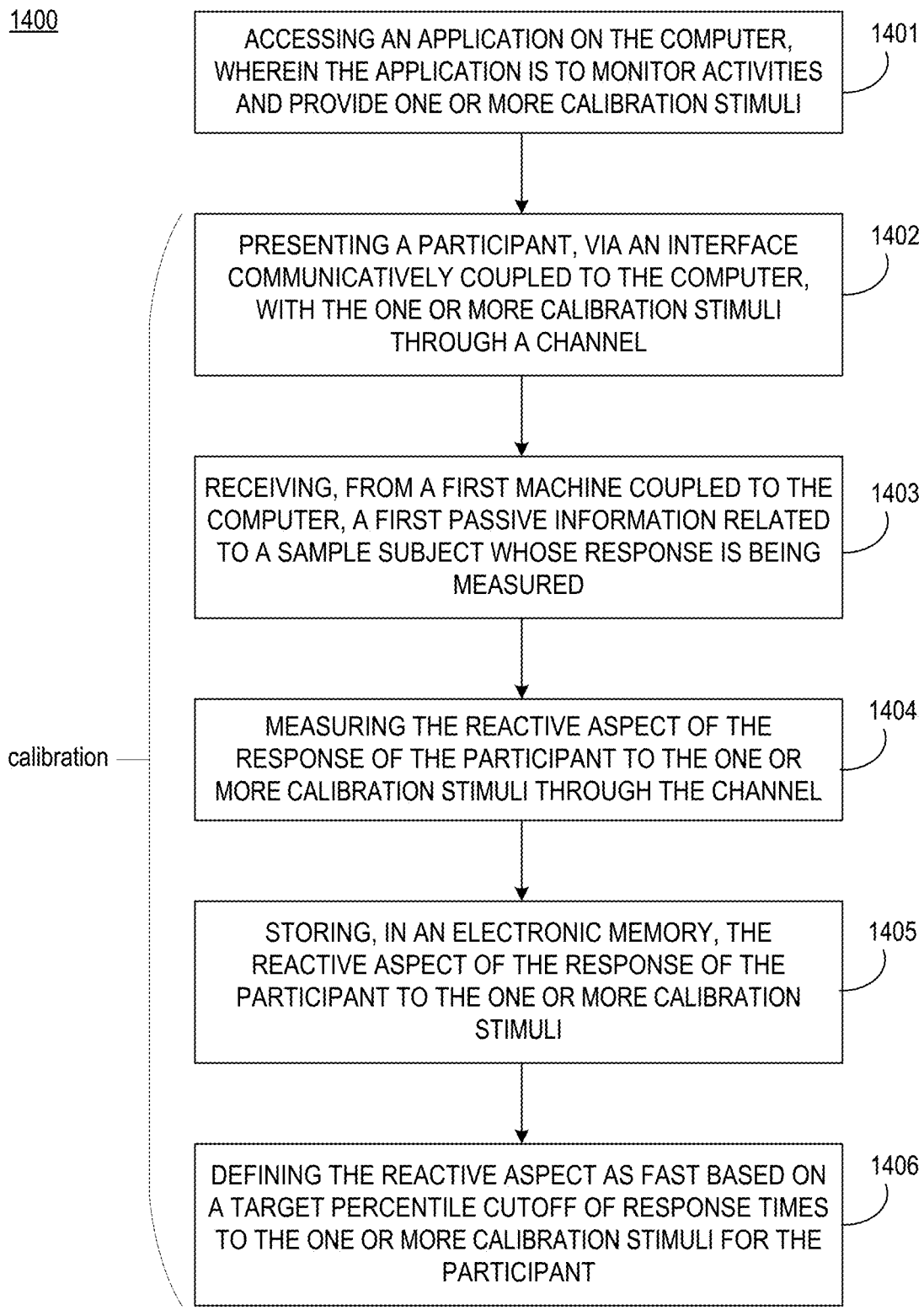
FIGS. 14A-C are flowcharts of a method to measure a response to one or more stimuli and to generate a response value indicative of the response, according to at least some examples.
Figure 14B:
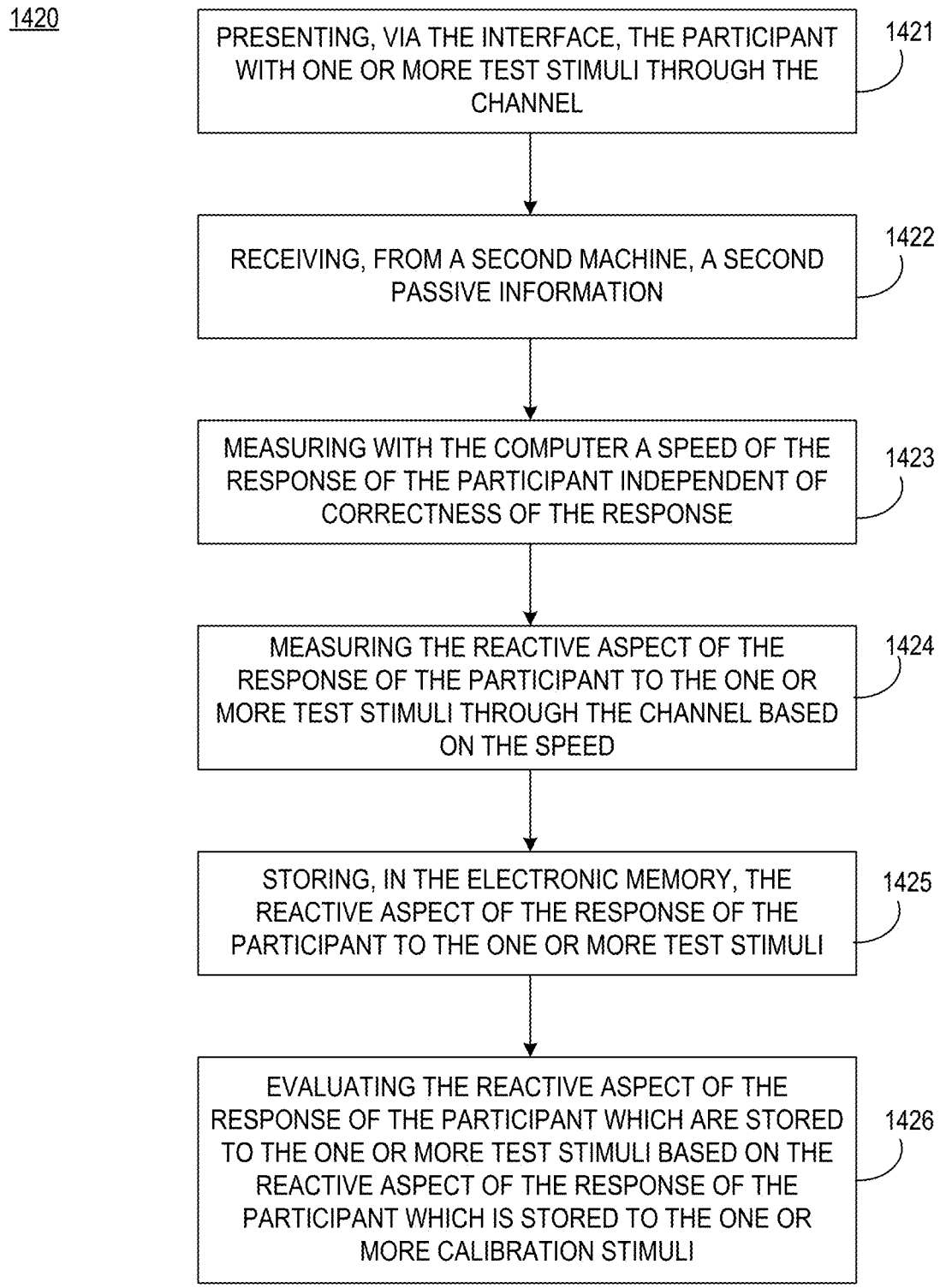
Figure 14C:
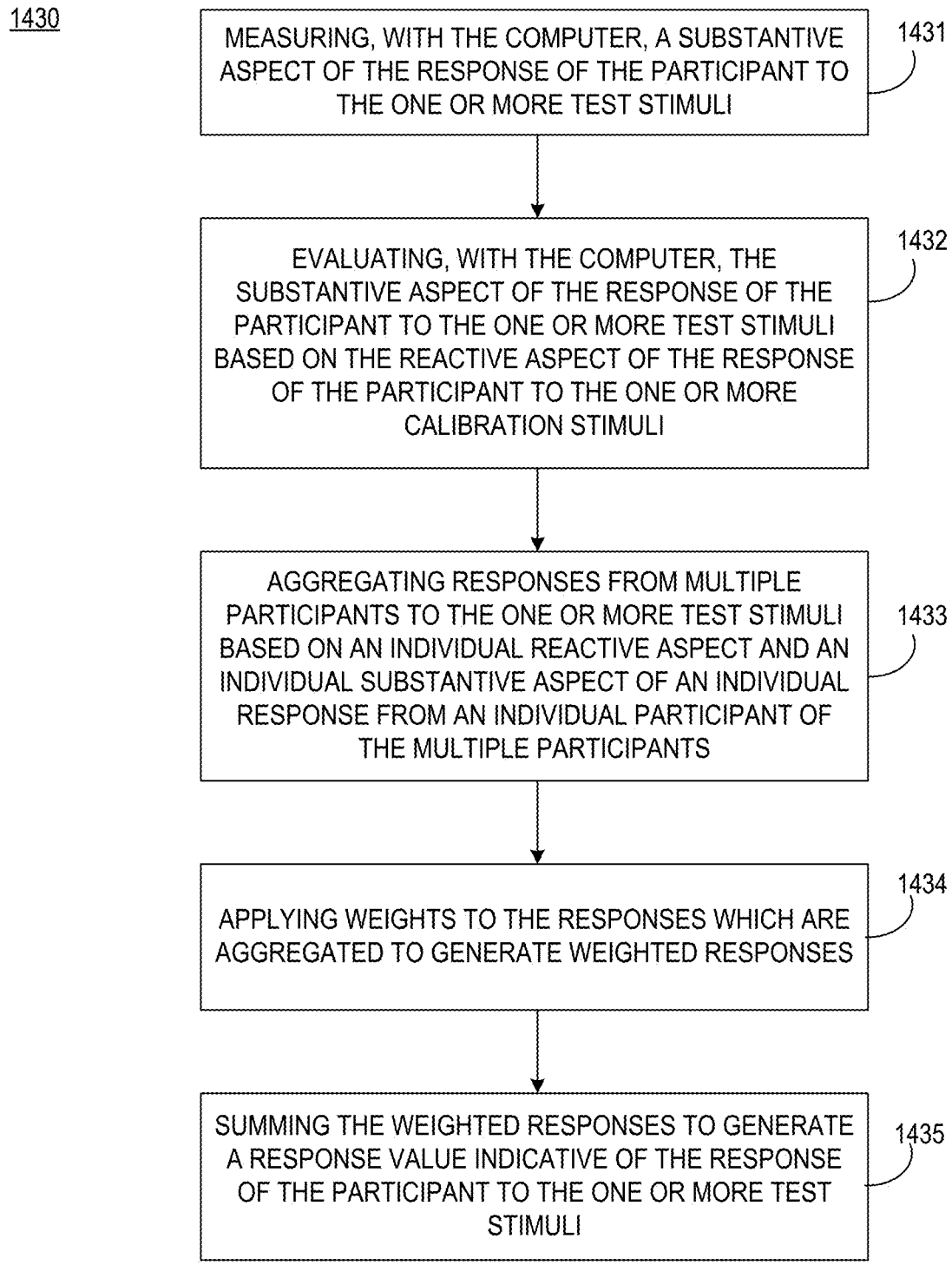

FIGS. 14A-C are flowcharts 1400, 1420, and 1430, respectively, of methods to measure a response to one or more stimuli and to generate a response value indicative of the response, according to at least some examples. While the blocks are shown in a particular order, the order can be modified. For example, some blocks may be performed before others and some blocks may be performed simultaneously. In at least one example, the blocks discussed herein can be performed by software, hardware, or a combination of them. In at least one example, flowcharts 1400 begins where a computer system presents a participant with a timed calibration test where all responses are known to be "fast."

Figure 1:
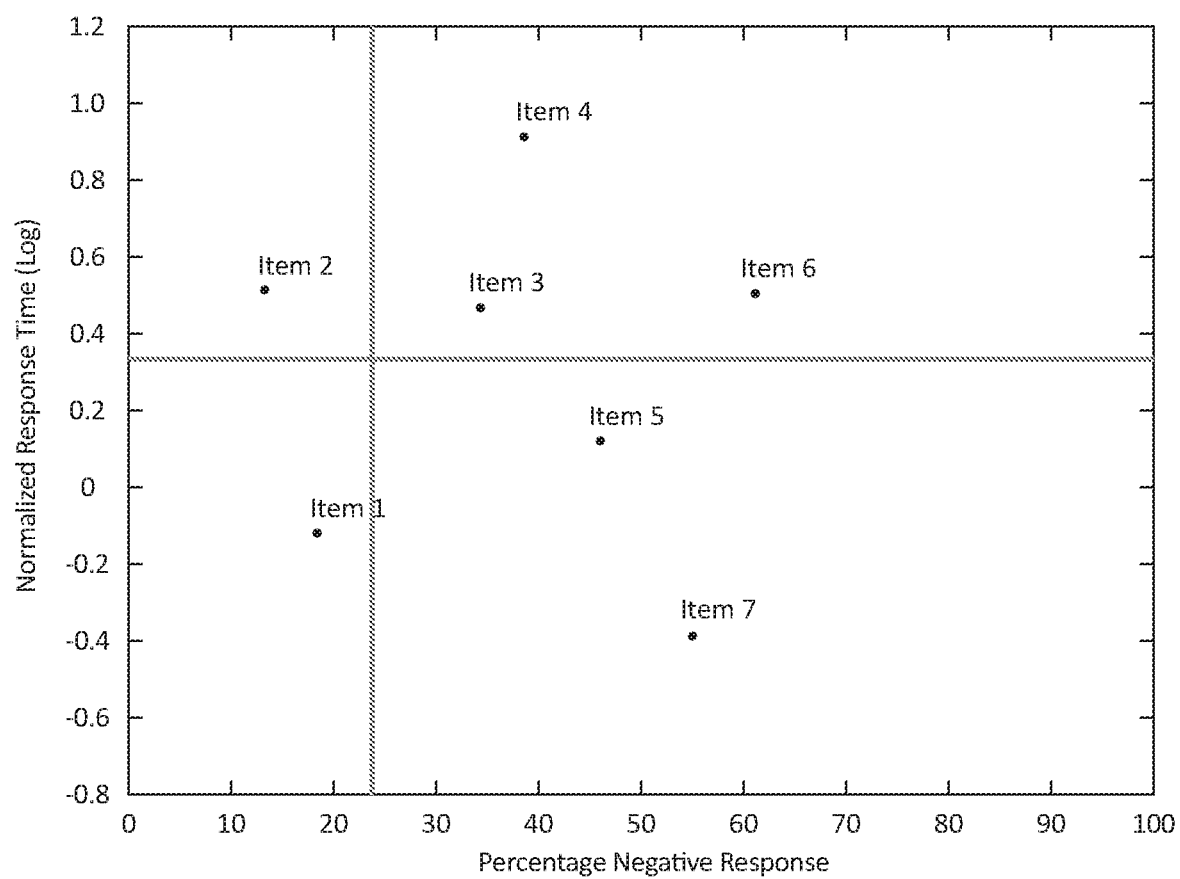
FIG. 1 illustrates a conventional technique for displaying the results of an online survey.

The computer system of at least one example executes flowcharts 1400, 1420, and/or 1430 which include a collection of methods that can be applied to measure faster than the awareness of a participant the reactive aspects to test stimuli which determines their mode of thinking used (e.g., either implicit/fast or explicit/slow) rather than just measuring reaction times as in FIG. 1. The computer system of at least one example also captures responses via one or more measured substantive aspects to the test stimuli to generate inferences about how modes of thinking impact substantive aspects to test stimuli and/or to generate computer logic to ask survey questions that deepen those inferences. Further, the computer system that implements these methods becomes a specialized machine that can produce rapid results. Here, rapid results refers to information faster than an awareness of a participant to the one or more calibration stimuli via a response of the participant through an interface.

At block 1401, in at least one example, an application is accessed on a computer, wherein the application monitors activities and provides one or more calibration stimuli. In at least one example, the one or more calibration stimuli include one or more questions, images, sounds, smell, lights with different intensities, colors, air speeds, air pressure, or any detectible stimuli that inspires a reaction, etc. In at least one example, the process of accessing comprises executing a weblink followed by entering authentication information of a participant. In at least one example, the authentication information is login information (e.g., user identification and password) which may be further secured by multi-factor authentication. In at least one example, the computer is a one of a desktop computer, a laptop, a server, a cloud, or a smart device (e.g., smart phone, tablet, etc.). In at least one example, the application may be downloaded on the computer so it may be accessible by a participant.

At block 1402, in at least one example, the participant is presented, via an interface communicatively coupled to the computer, with the one or more calibration stimuli through a channel. In at least one example, the channel comprises software, electronic hardware, or a combination of them. In at least one example, the channel can measure a reactive aspect of a response of the participant to the one or more calibration stimuli. In at least one example, the channel is coupled to the computer. In at least one example, the channel includes the application. In at least one example, the participant is one of a human, an animal, or an artificial intelligence (AI) generated persona. In at least one example, the interface is one of graphical user interface (GUI), an optical interface, an acoustic interface, a verbal interface, a tactile interface, or an auditory interface.

At block 1403, in at least one example, a first passive information is received from a first machine coupled to the computer. In at least one example, the first passive information is related to a sample subject whose response is being measured. In at least one example, the first machine generates the first passive information faster than an awareness of the participant to the one or more calibration stimuli via the response of the participant through the interface. In at least one example, the first machine is one of an electroencephalography (EEG) machine, a functional magnetic resonance imaging (fMRI) machine, a position emission tomography (PET) machine, an electromyography (EMG) machine, a facial recognition camera, an eye tracker, a heat sensor, a biometric machine, a smart watch, a speech recognition machine, or a wearable device. In at least one example, the sample subject is one of a human, an animal, or an AI generated persona.

At block 1404, in at least one example, the reactive aspect reactive aspect of the response of the participant to the one or more calibration stimuli through the channel is measured. In at least one example, the reactive aspect is independent of correctness of the response.

At block 1405, in at least one example, the reactive aspect of the response of the participant to the one or more calibration stimuli is stored in an electronic memory. In at least one example, the electronic memory includes volatile and non-volatile memory.

At block 1406, in at least one example, the reactive aspect is defined, identified, or characterized as fast based on a target percentile cutoff of response times to the one or more calibration stimuli for the participant. In at least one example, the target percentile cutoff is in the range of 85th percentile to $99^{th}$ percentile (where a typical target percentile cutoff is $95^{th}$ percentile). In at least one example, blocks 1402 through 1406 are part of a calibration process performed for a participant. In at least one example, after calibration process is complete, one or more test stimuli is provided to the participant as disused with reference to FIG. 14B.

At block 1421, in at least one example, the participant is presented via the interface with one or more test stimuli through the channel. In at least one example, the one or more test stimuli include one or more questions, images, sounds, smell, lights with different intensities, colors, air speeds, air pressure, or any detectible stimuli that inspires a reaction, etc.

At block 1422, in at least one example, a second passive information is received from a second machine. In at least one example, the second machine is configured to generate the second passive information faster than the awareness of the participant to the one or more test stimuli via the response of the participant through the interface. In at least one example, the second machine is same as the first machine or separate from the first machine. In at least one example, the second machine is one of an EEG machine, a fMRI machine, a PET machine, an EMG machine, a facial recognition camera, an eye tracker, a heat sensor, a biometric machine, a smart watch, a speech recognition machine, or a wearable device.

At block 1423, in at least one example, the speed of the response of the participant is measured with the computer. In at least one example, the speed is measured independent of correctness of the response.

At block 1424, in at least one example, the reactive aspect of the response of the participant to the one or more test stimuli through the channel is measured based on the speed. In at least one example, measuring of the reactive aspect to the one or more test stimuli is based on the first passive information, the second passive information, and/or the interface. In at least one example, the one or more test stimuli are dynamically adjusted in real time based on characterization of the participant.

At block 1425, in at least one example, the reactive aspect of the response of the participant to the one or more test stimuli is stored in the electronic memory.

At block 1426, in at least one example, the reactive aspect of the response of the participant which is stored to the one or more test stimuli is evaluated based on the reactive aspect of the response of the participant which is stored to the one or more calibration stimuli. In at least one example, the reactive aspect of the one or more test stimuli is slow if a response time of the participant to the one or more test stimuli is above the target percentile cutoff and fast if the response time is equal or below the target percentile cutoff.

FIG. 14C describes the role of a substantive aspect of the response, according to at least one example. At block 1431, in at least one example, the substantive aspect of the response of the participant to the one or more test stimuli is measured with the computer.

At block 1432, in at least one example, the substantive aspect of the response of the participant to the one or more test stimuli is evaluated with the computer based on the reactive aspect of the response of the participant to the one or more calibration stimuli. In at least one example, the one or more test stimuli are dynamically adjusted in real time based on the reactive aspect or the substantive aspect of the response of the participant to the one or more test stimuli.

At block 1433, in at least one example, responses from multiple participants to the one or more test stimuli are aggregated based on an individual reactive aspect and an individual substantive aspect of an individual response from an individual participant of the multiple participants. In at least one example, the participant is one of the multiple participants. In at least one example, the process of aggregating the responses comprises dividing the multiple participants into groups based on discrete characterizations of the individual reactive aspect and the individual substantive aspect of the individual response of the individual participant of the multiple participants. In at least one example, the responses which are aggregated are arranged in a two-dimensional representation. In at least one example, the two-dimensional representation are transformed to a one-dimensional representation.

At block 1434, in at least one example, weights are applied to the responses which are aggregated to generate weighted responses.

At block 1435, in at least one example, the weighted responses are summed to generate a response value indicative of the response of the participant to the one or more test stimuli.

In at least one example, the substantive aspect is a first substantive aspect, the one or more test stimuli is a first one or more test stimuli, and the response of the participant to the one or more test stimuli is a first response. In one such example, a second substantive aspect of a second response of the participant to a second one or more test stimuli is measured with the computer. In at least one example, the second substantive aspect of the second response of the participant is evaluated with the computer to the second one or more test stimuli based on the reactive aspect of the response of the participant to the one or more calibration stimuli.

Figure 15:
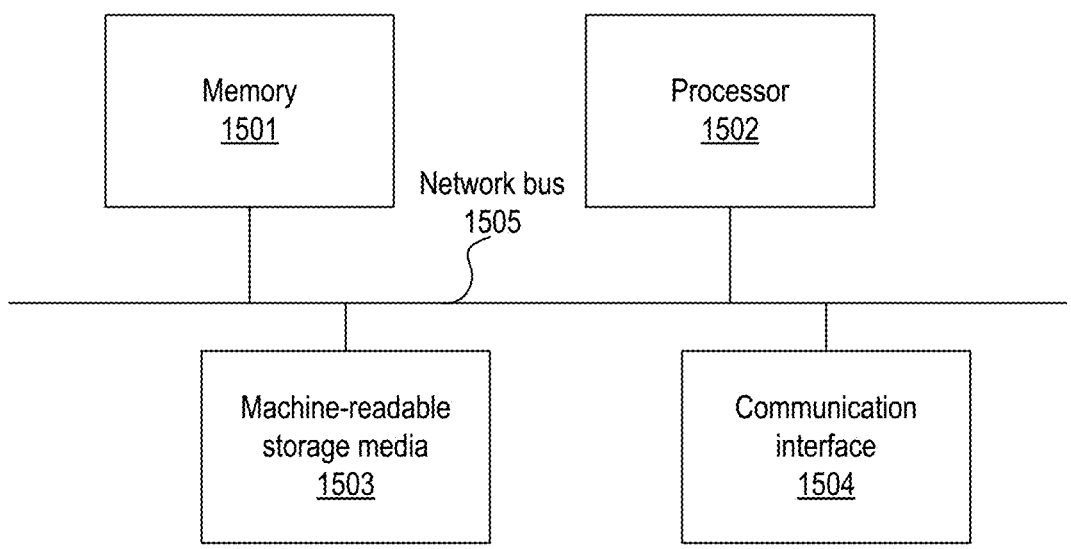
FIG. 15 is a schematic of a computing platform for measuring a response to one or more stimuli and for generating a response value indicative of the response, in accordance with at least one example.

FIG. 15 is a schematic of a computing platform 1500 for measuring a response to one or more stimuli and for generating a response value indicative of the response, in accordance with at least one example. In at least one example, the methods discussed herein are implemented as machine-executable instructions stored on a machine-readable media. In at least one example, the computer discussed herein comprises computing platform 1500 which includes a memory 1501, a processor 1502, a machine-readable storage medium 1503 (also referred to as tangible machine-readable medium or media), a communication interface 1504 (e.g., wireless or wired interface), and a network bus 1505 coupled together as shown.

In at least one example, processor 1502 is a digital signal processor (DSP), an application specific integrated circuit (ASIC), a general-purpose central processing unit (CPU), or a low power logic implementing a simple finite state machine to perform the methods and examples discussed herein, etc.

In at least one example, the various logic blocks of computing platform 1500 are coupled together via network bus 1505. Any suitable protocol may be used to implement network bus 505. In at least one example, machine-readable storage medium 1503 includes instructions (also referred to as the program software code/instructions) for measuring a response to one or more stimuli and for generating a response value indicative of the response as described with reference to various examples and flowchart.

In at least one example, program software code/instructions associated with the flowcharts (and/or various examples) and executed to implement examples of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software," or firmware embedded in processor. In at least one example, the program software code/instructions associated with the flowcharts (and/or various examples) are executed by computing platform 1500.

In at least one example, the program software code/instructions associated with the flowcharts (and/or various examples) are stored in machine-readable storage medium 1503 and executed by processor 1502. Here, machine-readable storage medium 1503 is a tangible machine-readable medium that can be used to store program software code/instructions and data that, when executed by a computing device, causes one or more processors (e.g., processor 1502) to perform a method(s) as may be recited in one or more accompanying claims directed to the disclosed subject matter.

In at least one example, the tangible machine-readable storage medium may include storage of the executable software program code/instructions and data in various tangible locations, including for example ROM, volatile RAM, non-volatile memory and/or cache, and/or other tangible memory as referenced in the present application. In at least one example, portions of this program software code/instructions and/or data may be stored in any one of these storage and memory devices. In at least one example, the program software code/instructions can be obtained from other storage, including, e.g., through centralized servers or peer-to-peer networks and the like, including the Internet. In at least one example, different portions of the software program code/instructions and data can be obtained at different times and in different communication sessions or in the same communication session.

In at least one example, the software program code/instructions (associated with the flowcharts and other examples) and data can be obtained in their entirety prior to the execution of a respective software program or application by the computing device. In at least one example, portions of the software program code/instructions and data can be obtained dynamically, e.g., just in time, when needed for execution. In at least one example, some combination of these ways of obtaining the software program code/instructions and data may occur, e.g., for different applications, components, programs, objects, modules, routines, or other sequences of instructions or organization of sequences of instructions, by way of example. In at least one example, the data and instructions may not be on a tangible machine-readable medium in entirety at a particular instance of time.

Examples of machine-readable storage medium 1503 include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical, or other forms of propagating signals, such as carrier waves, infrared signals, digital signals, etc., through such tangible communication links.

In at least one example, machine-readable storage medium includes any tangible mechanism that provides (e.g., stores and/or transmits in digital form, e.g., data packets) information in a form accessible by a machine (e.g., a computing device), which may be included, e.g., in a communication device, a computing device, a network device, a personal digital assistant, a manufacturing tool, a mobile communication device, whether or not able to download and run applications, and subsidized applications from the communication network, such as the Internet, e.g., an iPhone®, Galaxy®, Android®, or the like, or any other device including a computing device. In at least one example, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some examples of the disclosed subject matter.

The following examples are provided that illustrate the various examples of the disclosure. The examples can be combined with other examples. As such, various examples can be combined with other examples without changing the scope of the invention.

Example 1 is a method to measure a response to one or more stimuli, wherein the method is implemented by a computer, the method comprising: accessing an application on the computer, wherein the application is to monitor activities and provide one or more calibration stimuli; presenting a participant, via an interface communicatively coupled to the computer, with the one or more calibration stimuli through a channel comprising software, electronic hardware or a combination of them, wherein the channel is capable of measuring a reactive aspect of a response of the participant to the one or more calibration stimuli, wherein the channel is coupled to the computer, wherein the channel includes the application; receiving, from a first machine coupled to the computer, a first passive information related to a sample subject whose response is being measured, wherein the first machine is to generate the first passive information faster than an awareness of the participant to the one or more calibration stimuli via the response of the participant through the interface, wherein the first machine is one of an EEG machine, an fMRI machine, a PET machine, an EMG machine, a facial recognition camera, an eye tracker, a heat sensor, a biometric machine, a smart watch, a speech recognition machine, or a wearable device; measuring the reactive aspect of the response of the participant to the one or more calibration stimuli through the channel, wherein the reactive aspect is independent of correctness of the response; storing, in an electronic memory, the reactive aspect of the response of the participant to the one or more calibration stimuli; defining the reactive aspect as fast based on a target percentile cutoff of response times to the one or more calibration stimuli for the participant; presenting, via the interface, the participant with one or more test stimuli through the channel; receiving, from a second machine, a second passive information, wherein the second machine is configured to generate the second passive information faster than the awareness of the participant to the one or more test stimuli via the response of the participant through the interface, wherein the second machine is same as the first machine or separate from the first machine; measuring with the computer a speed of the response of the participant independent of correctness of the response; measuring the reactive aspect of the response of the participant to the one or more test stimuli through the channel based on the speed, wherein measuring of the reactive aspect to the one or more test stimuli is based on the first passive information, the second passive information, and/or the interface; storing, in the electronic memory, the reactive aspect of the response of the participant to the one or more test stimuli; evaluating the reactive aspect of the response of the participant which are stored to the one or more test stimuli based on the reactive aspect of the response of the participant which is stored to the one or more calibration stimuli, wherein the reactive aspect of the one or more test stimuli is slow if a response time of the participant to the one or more test stimuli is above the target percentile cutoff, and fast if the response time is equal or below the target percentile cutoff; measuring, with the computer, a substantive aspect of the response of the participant to the one or more test stimuli; evaluating, with the computer, the substantive aspect of the response of the participant to the one or more test stimuli based on the reactive aspect of the response of the participant to the one or more calibration stimuli; aggregating responses from multiple participants to the one or more test stimuli based on an individual reactive aspect and an individual substantive aspect of an individual response from an individual participant of the multiple participants, wherein the participant is one of the multiple participants; applying weights to the responses which are aggregated to generate weighted responses; and summing the weighted responses to generate a response value indicative of the response of the participant to the one or more test stimuli.

Example 2 is a method according to any example herein, in particular example 1, wherein accessing comprises executing a weblink followed by entering authentication information of the participant.

Example 3 is a method according to any example herein, in particular example 2, wherein the participant is one of a human, an animal, or an artificial intelligence generated persona.

Example 4 is a method according to any example herein, in particular example 1, wherein the interface is one of a GUI, an optical interface, an acoustic interface, a verbal interface, a tactile interface, or an auditory interface.

Example 5 is a method according to any example herein, in particular example 1, wherein the sample subject is one of a human, an animal, or an artificial intelligence generated persona.

Example 6 is a method according to any example herein, in particular example 1, wherein the target percentile cutoff is in a range of 85th percentile to 99th percentile.

Example 7 is a method according to any example herein, in particular example 1, wherein the one or more calibration stimuli and the one or more test stimuli comprise one or more questions.

Example 8 is a method according to any example herein, in particular example 1, wherein the one or more calibration stimuli and the one or more test stimuli comprise images.

Example 9 is a method according to any example herein, in particular example 1, wherein the substantive aspect is a first substantive aspect, wherein the one or more test stimuli is a first one or more test stimuli, wherein the response of the participant to the one or more test stimuli is a first response, wherein the method further comprises: measuring, with the computer, a second substantive aspect of a second response of the participant to a second one or more test stimuli; and evaluating, with the computer, the second substantive aspect of the second response of the participant to the second one or more test stimuli based on the reactive aspect of the response of the participant to the one or more calibration stimuli.

Example 10 is a method according to any example herein, in particular example 1, wherein aggregating the responses includes: dividing the multiple participants into groups based on discrete characterizations of the individual reactive aspect and the individual substantive aspect of the individual response of the individual participant of the multiple participants.

Example 11 is a method according to any example herein, in particular example 1, wherein the responses which are aggregated are arranged in a two-dimensional representation, and wherein the method further comprises transforming the two-dimensional representation to a one-dimensional representation.

Example 12 is a method according to any example herein, in particular example 1, further comprising dynamically adjusting, in real time, the one or more test stimuli based on the reactive aspect or the substantive aspect of the response of the participant to the one or more test stimuli.

Example 13 is a method according to any example herein, in particular example 1, further comprising dynamically adjusting, in real time, the one or more test stimuli based on characterization of the participant.

Example 14 is a method according to any example herein, in particular example 1, wherein the computer is one of a desktop computer, a laptop, a server, a cloud, or a smart device.

Example 15 is a machine-readable storage media having machine-readable instructions stored thereon that when executed cause one or more machines to perform a method to measure a response to one or more stimuli, the method comprising: accessing an application on a computer, wherein the application is to monitor activities and provide one or more calibration stimuli; presenting a participant, via an interface communicatively coupled to the computer, with the one or more calibration stimuli through a channel comprising software, electronic hardware, or a combination of them, wherein the channel is capable of measuring a reactive aspect of a response of the participant to the one or more calibration stimuli, wherein the channel is coupled to the computer, wherein the channel includes the application; receiving, from a first machine coupled to the computer, a first passive information related to a sample subject whose response is being measured, wherein the first machine is to generate the first passive information faster than an awareness of the participant to the one or more calibration stimuli via the response of the participant through the interface, wherein the first machine is one of an EEG machine, an fMRI machine, a PET machine, an EMG machine, a facial recognition camera, an eye tracker, a heat sensor, a biometric machine, a smart watch, a speech recognition machine, or a wearable device; measuring the reactive aspect of the response of the participant to the one or more calibration stimuli through the channel, wherein the reactive aspect is independent of correctness of the response; storing, in an electronic memory, the reactive aspect of the response of the participant to the one or more calibration stimuli; defining the reactive aspect as fast based on a target percentile cutoff of response times to the one or more calibration stimuli for the participant; presenting, via the interface, the participant with one or more test stimuli through the channel; receiving, from a second machine, a second passive information, wherein the second machine is configured to generate the second passive information faster than the awareness of the participant to the one or more test stimuli via the response of the participant through the interface, wherein the second machine is same as the first machine or separate from the first machine; measuring with the computer a speed of the response of the participant independent of correctness of the response; measuring the reactive aspect of the response of the participant to the one or more test stimuli through the channel based on the speed, wherein measuring of the reactive aspect to the one or more test stimuli is based on the first passive information, the second passive information, and/or the interface; storing, in the electronic memory, the reactive aspect of the response of the participant to the one or more test stimuli; evaluating the reactive aspect of the response of the participant which are stored to the one or more test stimuli based on the reactive aspect of the response of the participant which is stored to the one or more calibration stimuli, wherein the reactive aspect of the one or more test stimuli is slow if a response time of the participant to the one or more test stimuli is above the target percentile cutoff and fast if the response time is equal or below the target percentile cutoff; measuring, with the computer, a substantive aspect of the response of the participant to the one or more test stimuli; evaluating, with the computer, the substantive aspect of the response of the participant to the one or more test stimuli based on the reactive aspect of the response of the participant to the one or more calibration stimuli; aggregating responses from multiple participants to the one or more test stimuli based on an individual reactive aspect and an individual substantive aspect of an individual response from an individual participant of the multiple participants, wherein the participant is one of the multiple participants; applying weights to the responses which are aggregated to generate weighted responses; and summing the weighted responses to generate a response value indicative of the response of the participant to the one or more test stimuli.

Example 16 is a machine-readable storage media according to any example herein, in particular example 15, wherein accessing comprises executing a weblink followed by entering authentication information of the participant, and wherein the participant is one of a human, an animal, or an artificial intelligence generated persona.

Example 17 is a machine-readable storage media according to any example herein, in particular example 15, wherein the interface is one of a GUI, an optical interface, an acoustic interface, a verbal interface, a tactile interface, or an auditory interface.

Example 18 is a machine-readable storage media according to any example herein, in particular example 15, wherein the sample subject is one of a human, an animal, or an artificial intelligence generated persona.

Example 19 is a machine-readable storage media according to any example herein, in particular example 15, wherein the target percentile cutoff is in a range of 85th percentile to $99^{th}$ percentile.

Example 20 is a system comprising: a memory; a processor coupled to the memory; a communication interface coupled to the processor and the memory, wherein the processor is operable to: access an application on a cloud, wherein the application is to monitor activities and provide one or more calibration stimuli; present a participant, via an interface communicatively coupled to the cloud, with the one or more calibration stimuli through a channel comprising software, electronic hardware or a combination of them, wherein the channel is capable of measuring a reactive aspect of a response of the participant to the one or more calibration stimuli, wherein the channel is coupled to the cloud, wherein the channel includes the application; receive, from a first machine coupled to the cloud, a first passive information related to a sample subject whose response is being measured, wherein the first machine is to generate the first passive information faster than an awareness of the participant to the one or more calibration stimuli via the response of the participant through the interface, wherein the first machine is one of an EEG machine, an fMRI machine, a PET machine, an EMG machine, a facial recognition camera, an eye tracker, a heat sensor, a biometric machine, a smart watch, a speech recognition machine, or a wearable device; measure the reactive aspect of the response of the participant to the one or more calibration stimuli through the channel, wherein the reactive aspect is independent of correctness of the response; store, in an electronic memory, the reactive aspect of the response of the participant to the one or more calibration stimuli; define the reactive aspect as fast based on a target percentile cutoff of response times to the one or more calibration stimuli for the participant; present, via the interface, the participant with one or more test stimuli through the channel; receive, from a second machine, a second passive information, wherein the second machine is configured to generate the second passive information faster than the awareness of the participant to the one or more test stimuli via the response of the participant through the interface, wherein the second machine is same as the first machine or separate from the first machine; measure with the cloud, a speed of the response of the participant independent of correctness of the response; measure the reactive aspect of the response of the participant to the one or more test stimuli through the channel based on the speed, wherein the reactive aspect to the one or more test stimuli is measured based on the first passive information, the second passive information, and/or the interface; store, in the electronic memory, the reactive aspect of the response of the participant to the one or more test stimuli; evaluate the reactive aspect of the response of the participant which are stored to the one or more test stimuli based on the reactive aspect of the response of the participant which is stored to the one or more calibration stimuli, wherein the reactive aspect of the one or more test stimuli is slow if a response time of the participant to the one or more test stimuli is above the target percentile cutoff and fast if the response time is equal or below the target percentile cutoff; measure, with the cloud, a substantive aspect of the response of the participant to the one or more test stimuli; evaluate, with the cloud, the substantive aspect of the response of the participant to the one or more test stimuli based on the reactive aspect of the response of the participant to the one or more calibration stimuli; aggregate responses from multiple participants to the one or more test stimuli based on an individual reactive aspect and an individual substantive aspect of an individual response from an individual participant of the multiple participants, wherein the participant is one of the multiple participants; apply weights to the responses which are aggregated to generate weighted responses; and sum the weighted responses to generate a response value indicative of the response of the participant to the one or more test stimuli.

What is claimed is:

1. A method to measure a response to one or more stimuli, wherein the method is implemented by a computer, the method comprising:
   downloading an application on the computer;
   accessing the application on the computer, wherein the application is to monitor activities and provide one or more calibration stimuli;
   presenting a participant, via an interface communicatively coupled to the computer, with the one or more calibration stimuli through a channel comprising software, electronic hardware or a combination of them, wherein the channel is capable of measuring a reactive aspect of a response of the participant to the one or more calibration stimuli, and wherein the channel is coupled to the computer;
   receiving, from a first machine coupled to the computer, a first passive information related to a sample subject whose response is being measured, wherein the first machine is to generate the first passive information faster than an awareness of the participant to the one or more calibration stimuli via the response of the participant through the interface, and wherein the first machine is one of an EEG machine, an fMRI machine, a PET machine, an EMG machine, a facial recognition camera, an eye tracker, a heat sensor, a machine to measure skin conductance, a machine to measure heart rate, a machine to measure breathing, or a speech recognition machine;
   measuring the reactive aspect of the response of the participant to the one or more calibration stimuli through the channel, wherein the reactive aspect is independent of correctness of the response;
   storing, in an electronic memory, the reactive aspect of the response of the participant to the one or more calibration stimuli;
   defining the reactive aspect as fast based on a target percentile cutoff of response times to the one or more calibration stimuli for the participant;
   presenting, via the interface, the participant with one or more test stimuli through the channel;
   receiving, from a second machine, a second passive information, wherein the second machine is configured to generate the second passive information faster than the awareness of the participant to the one or more test stimuli via the response of the participant through the interface, and wherein the second machine is same as the first machine or separate from the first machine;
   measuring with the computer a speed of the response of the participant independent of correctness of the response;
   measuring the reactive aspect of the response of the participant to the one or more test stimuli through the channel based on the speed, wherein measuring of the reactive aspect to the one or more test stimuli is based on the first passive information, the second passive information, and/or the interface;
   storing, in the electronic memory, the reactive aspect of the response of the participant to the one or more test stimuli;
   evaluating the reactive aspect of the response of the participant which are stored to the one or more test stimuli based on the reactive aspect of the response of the participant which is stored to the one or more calibration stimuli, wherein the reactive aspect of the one or more test stimuli is slow if a response time of the participant to the one or more test stimuli is above the target percentile cutoff and fast if the response time is equal or below the target percentile cutoff;
   measuring, with the computer, a substantive aspect of the response of the participant to the one or more test stimuli;
   evaluating, with the computer, the substantive aspect of the response of the participant to the one or more test stimuli based on the reactive aspect of the response of the participant to the one or more calibration stimuli;
   aggregating responses from multiple participants to the one or more test stimuli based on an individual reactive aspect and an individual substantive aspect of an individual response from an individual participant of the multiple participants, wherein the participant is one of the multiple participants;
   applying weights to the responses which are aggregated to generate weighted responses; and
   summing the weighted responses to generate a response value indicative of the response of the participant to the one or more test stimuli.

2. The method of claim 1, wherein accessing comprises executing a weblink followed by entering authentication information of the participant.

3. The method of claim 2, wherein the participant is one of a human, an animal, or an artificial intelligence generated persona.

4. The method of claim 1, wherein the interface is one of graphical user interface (GUI), an optical interface, an acoustic interface, a verbal interface, a tactile interface, or an auditory interface.

5. The method of claim 1, wherein the sample subject is one of an animal or an artificial intelligence generated persona.

6. The method of claim 1, wherein the target percentile cutoff is in a range from 85% percentile to $99^{th}$ percentile.

7. The method of claim 1, wherein the one or more calibration stimuli and the one or more test stimuli comprise one or more questions.

8. The method of claim 1, wherein the one or more calibration stimuli and the one or more test stimuli comprise images.

9. The method of claim 1, wherein the substantive aspect is a first substantive aspect, wherein the one or more test stimuli is a first one or more test stimuli, wherein the response of the participant to the one or more test stimuli is a first response, and wherein the method further comprises:
   measuring, with the computer, a second substantive aspect of a second response of the participant to a second one or more test stimuli; and
   evaluating, with the computer, the second substantive aspect of the second response of the participant to the second one or more test stimuli based on the reactive aspect of the response of the participant to the one or more calibration stimuli.

10. The method of claim 1, wherein aggregating the responses includes:
    dividing the multiple participants into groups based on discrete characterizations of the individual reactive aspect and the individual substantive aspect of the individual response of the individual participant of the multiple participants.

11. The method of claim 1, wherein the responses which are aggregated are arranged in a two-dimensional representation, and wherein the method further comprises transforming the two-dimensional representation to a one-dimensional representation.

12. The method of claim 1, further comprising dynamically adjusting, in real time, the one or more test stimuli based on the reactive aspect or the substantive aspect of the response of the participant to the one or more test stimuli.

13. The method of claim 1, further comprising dynamically adjusting, in real time, the one or more test stimuli based on characterization of the participant.

14. The method of claim 1, wherein the computer is one of a desktop computer, a laptop, a server, a cloud, or a smart device.

15. A non-transitory machine-readable storage media having machine-readable instructions stored thereon that when executed cause one or more machines to perform a method to measure a response to one or more stimuli, the method comprising:

accessing an application on a computer, wherein the application is downloaded on the computer, wherein the application is to monitor activities and provide one or more calibration stimuli;

presenting a participant, via an interface communicatively coupled to the computer, with the one or more calibration stimuli through a channel comprising software, electronic hardware or a combination of them, wherein the channel is capable of measuring a reactive aspect of a response of the participant to the one or more calibration stimuli, and wherein the channel is coupled to the computer;

receiving, from a first machine coupled to the computer, a first passive information related to a sample subject whose response is being measured, wherein the first machine is to generate the first passive information faster than an awareness of the participant to the one or more calibration stimuli via the response of the participant through the interface, and wherein the first machine is one of an EEG machine, an fMRI machine, a PET machine, an EMG machine, a facial recognition camera, an eye tracker, a heat sensor, a machine to measure skin conductance, a machine to measure heart rate, a machine to measure breathing, or a speech recognition machine;

measuring the reactive aspect of the response of the participant to the one or more calibration stimuli through the channel, wherein the reactive aspect is independent of correctness of the response;

storing, in an electronic memory, the reactive aspect of the response of the participant to the one or more calibration stimuli;

defining the reactive aspect as fast based on a target percentile cutoff of response times to the one or more calibration stimuli for the participant;

presenting, via the interface, the participant with one or more test stimuli through the channel;

receiving, from a second machine, a second passive information, wherein the second machine is configured to generate the second passive information faster than the awareness of the participant to the one or more test stimuli via the response of the participant through the interface, and wherein the second machine is same as the first machine or separate from the first machine;

measuring with the computer a speed of the response of the participant independent of correctness of the response;

measuring the reactive aspect of the response of the participant to the one or more test stimuli through the channel based on the speed, wherein measuring of the reactive aspect to the one or more test stimuli is based on the first passive information, the second passive information, and/or the interface;

storing, in the electronic memory, the reactive aspect of the response of the participant to the one or more test stimuli;

evaluating the reactive aspect of the response of the participant which are stored to the one or more test stimuli based on the reactive aspect of the response of the participant which is stored to the one or more calibration stimuli, wherein the reactive aspect of the one or more test stimuli is slow if a response time of the participant to the one or more test stimuli is above the target percentile cutoff and fast if the response time is equal or below the target percentile cutoff;

measuring, with the computer, a substantive aspect of the response of the participant to the one or more test stimuli;

evaluating, with the computer, the substantive aspect of the response of the participant to the one or more test stimuli based on the reactive aspect of the response of the participant to the one or more calibration stimuli;

aggregating responses from multiple participants to the one or more test stimuli based on an individual reactive aspect and an individual substantive aspect of an individual response from an individual participant of the multiple participants, wherein the participant is one of the multiple participants;

applying weights to the responses which are aggregated to generate weighted responses; and summing the weighted responses to generate a response value indicative of the response of the participant to the one or more test stimuli.

16. The non-transitory machine-readable storage media of claim 15, wherein accessing comprises executing a weblink followed by entering authentication information of the participant, and wherein the participant is one of a human, an animal, or an artificial intelligence generated persona.

17. The non-transitory machine-readable storage media of claim 15, wherein the interface is one of graphical user interface (GUI), an optical interface, an acoustic interface, a verbal interface, a tactile interface, or an auditory interface.

18. The non-transitory machine-readable storage media of claim 15, wherein the sample subject is one of an animal or an artificial intelligence generated persona.

19. The non-transitory machine-readable storage media of claim 15, wherein the target percentile cutoff is in a range from 85% percentile to $99^{th}$ percentile.

20. A system comprising:
a memory;
a processor coupled to the memory; and
a communication interface coupled to the processor and the memory, wherein the processor is operable to:
download an application on a cloud;
access the application on the cloud, wherein the application is to monitor activities and provide one or more calibration stimuli;
present a participant, via an interface communicatively coupled to the cloud, with the one or more calibration stimuli through a channel comprising software, electronic hardware or a combination of them, wherein the channel is capable of measuring a reactive aspect of a response of the participant to the one or more calibration stimuli, wherein the channel is coupled to the cloud;
receive, from a first machine coupled to the cloud, a first passive information related to a sample subject whose response is being measured, wherein the first machine is to generate the first passive information faster than an awareness of the participant to the one or more calibration stimuli via the response of the participant through the interface, and wherein the first machine is one of an EEG machine, an fMRI machine, a PET machine, an EMG machine, a facial recognition camera, an eye tracker, a heat sensor, a machine to measure skin conductance, a machine to measure heart rate, a machine to measure breathing, or a speech recognition machine;

measure the reactive aspect of the response of the participant to the one or more calibration stimuli through the channel, wherein the reactive aspect is independent of correctness of the response;

store, in an electronic memory, the reactive aspect of the response of the participant to the one or more calibration stimuli;

define the reactive aspect as fast based on a target percentile cutoff of response times to the one or more calibration stimuli for the participant;

present, via the interface, the participant with one or more test stimuli through the channel;

receive, from a second machine, a second passive information, wherein the second machine is configured to generate the second passive information faster than the awareness of the participant to the one or more test stimuli via the response of the participant through the interface, and wherein the second machine is same as the first machine or separate from the first machine;

measure with the cloud a speed of the response of the participant independent of correctness of the response;

measure the reactive aspect of the response of the participant to the one or more test stimuli through the channel based on the speed, wherein the reactive aspect to the one or more test stimuli is measured based on the first passive information, the second passive information, and/or the interface;

store, in the electronic memory, the reactive aspect of the response of the participant to the one or more test stimuli;

evaluate the reactive aspect of the response of the participant which are stored to the one or more test stimuli based on the reactive aspect of the response of the participant which is stored to the one or more calibration stimuli, wherein the reactive aspect of the one or more test stimuli is slow if a response time of the participant to the one or more test stimuli is above the target percentile cutoff and fast if the response time is equal or below the target percentile cutoff;

measure, with the cloud, a substantive aspect of the response of the participant to the one or more test stimuli;

evaluate, with the cloud, the substantive aspect of the response of the participant to the one or more test stimuli based on the reactive aspect of the response of the participant to the one or more calibration stimuli;

aggregate responses from multiple participants to the one or more test stimuli based on an individual reactive aspect and an individual substantive aspect of an individual response from an individual participant of the multiple participants, wherein the participant is one of the multiple participants;

apply weights to the responses which are aggregated to generate weighted responses; and sum the weighted responses to generate a response value indicative of the response of the participant to the one or more test stimuli.

* * * * *